Figure 1:
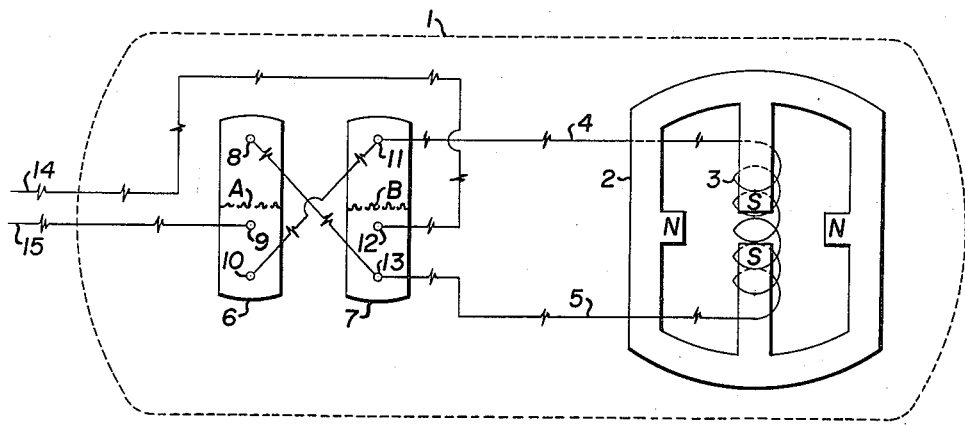

Philip S. Williams  Inventor

United States Patent Office 2,920,308
Patented Jan. 5, 1960

2,920,308

GEOPHONE

Philip S. Williams, Tulsa, Okla., assignor, by mesne assignments, to Jersey Production Research Company Application July 19, 1955, Serial No. 523,032

2 Claims. (Cl. 340—17)

The present invention is concerned with a novel form of geophone of the self-planting type. The geophone of the present invention is characterized by having two relatively large flat surfaces and being relatively thin with rounded edges. The geophone of the present invention, by being relatively flat and thin with rounded edges like a pancake, will always lie horizontally on one of its flat faces and thus it can be tossed on the ground from a rapidly moving truck. More specific adaptations of the geophone of the present invention is to employ a single coil in conjunction with a reversing switch so as to always insure the correct polarity of all pick-ups connected in multiple. On the other hand, a double coil construction may be employed in the pancake geophone of the present invention in which case it will not be necessary to utilize the reversing switch. If a single coil unit with a reversing switch be utilized in the geophone of the present invention; and if the geophone be of a relatively low frequency, a specific adaptation is to employ balancing means in conjunction with this low frequency, single coil, reversing switch geophone.

As pointed out, the present invention permits the seismic pickups to be permanently connected on to a cable in multiple for rapidly placing the arrays and for picking up the arrays after the traces have been obtained.

In conventional seismograph prospecting, it is usual to detonate a charge of explosive at or near the earth's surface and to detect the resulting earth tremors at a plurality of spaced points by the use of various seismic or geophone arrays. At each of the selected points there is positioned a seismic pickup or geophone which converts the earth tremors into electrical impulses. These electrical impulses are fed over cables to a central recording station, which is usually a mobile unit. At the recording station the electrical impulses from the respective geophones are amplified usually by conventional vacuum tube amplifiers and fed to a recording device for permanent recordation. Usually each geophone location produces one trace on the record; however, in certain instances a plurality of geophones may be employed to secure a single trace. Conventionally, a seismograph record is obtained by means of a number of moving coil galvanometers each one of which has a mirror attached thereto. The mirrors are usually arranged in such relationship to a source of light and a moving strip of sensitized paper or film is employed for recording on the paper or film a plurality of wave forms or traces which is representative of the seismic waves that have been picked up by the individual geophones. The strip of paper or film is moved longitudinally at a substantially constant speed and is provided with suitable timing marks so that when the seismograph record or section is later examined it is possible to determine the length of time required for the arrival of seismic waves at any particular point on the earth's surface either directly from the source or by reflection from underlying strata. From other data obtained in the area being studied, such as seismic wave velocities in the various earth layers, it is then possible to estimate the depth of the various reflecting strata.

The making of seismograph records in the manner above referred to is of value in that it gives information regarding the nature of the earth's substrata based on the principle that part of the energy of the artificial seismic shock will travel downwardly and will be reflected back toward the surface by various, more or less well defined substrata horizons, and that this reflected energy will be detected by the geophones and will be recorded on the seismograph record. Since these geophones at times may be positioned at considerable distances one from the other, it is very desirable to reduce the time and expense of individually positioning each geophone. Thus, it is one object of the present invention to use a particularly designed geophone or seismic pickup which may be tossed on the ground from a moving truck, thus saving appreciable time.

Several reasons heretofore why this was not possible was the fact that the pickup could fall on either side and thus the correct polarity would not be secured when a number of geophones were connected in multiple. Another disadvantage was the fact that in order to support the movement properly, it was necessary to provide enough clearance for sag of the movement irrespective of which side of the geophone was uppermost. If the sufficient tolerance were provided on either side, the geophone would be too thick and impractical.

The present invention is concerned with an improved geophone which can be tossed on the ground and will initiate the correct polarity irrespective of which side is up. Furthermore, the movement will be supported in a manner so that it is not necessary to provide excessive clearance on each side irrespective of which side of the geophone is uppermost.

This latter problem is more acute when the geophone is of a relatively low frequency since the movement of low frequency coils is greater than the movement of relatively high frequency coils such as those having frequencies above about 20 cycles per second or more. For instance, the sag under gravity of coils 20 cycles per second or more is about $10/f.^2$ (in./(c.p.s.)$^2$) or less than $\frac{1}{40}$ inch each way. However, at a natural frequency of 4 cycles per second or less, at least $\frac{5}{8}$ of an inch of sag must be provided for each way in addition to the clearance needed for the earth's motion. This in effect means that it is necessary to add to the height of the coil magnet case and the like $1\frac{1}{4}$ inches which would make the pancake geophone too thick. Thus, it is the object of the present invention to provide a geophone which is self-correcting with respect to the factors mentioned.

Figure 2:
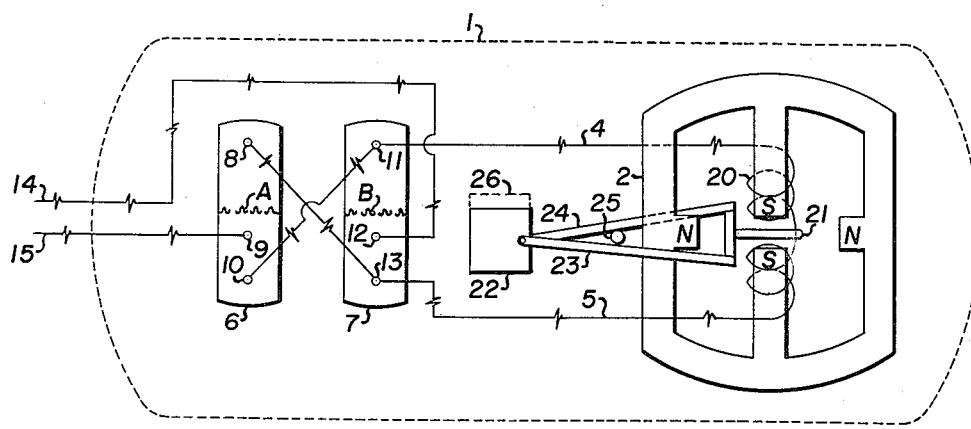
Figure 3:
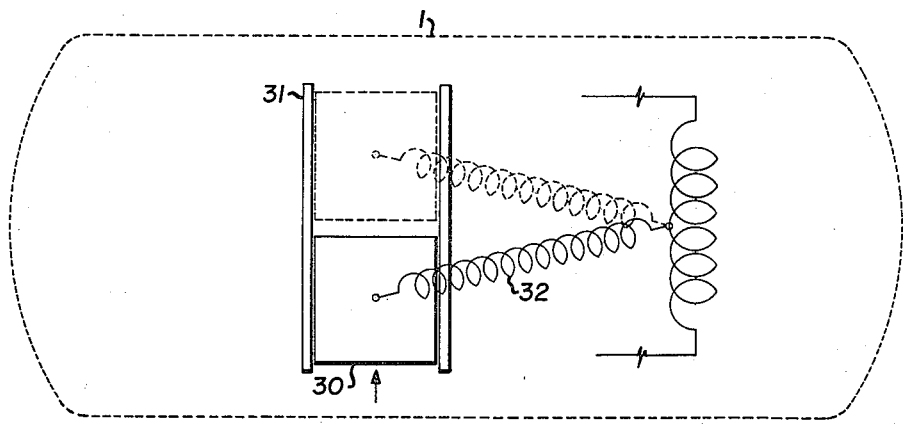
Figure 4:
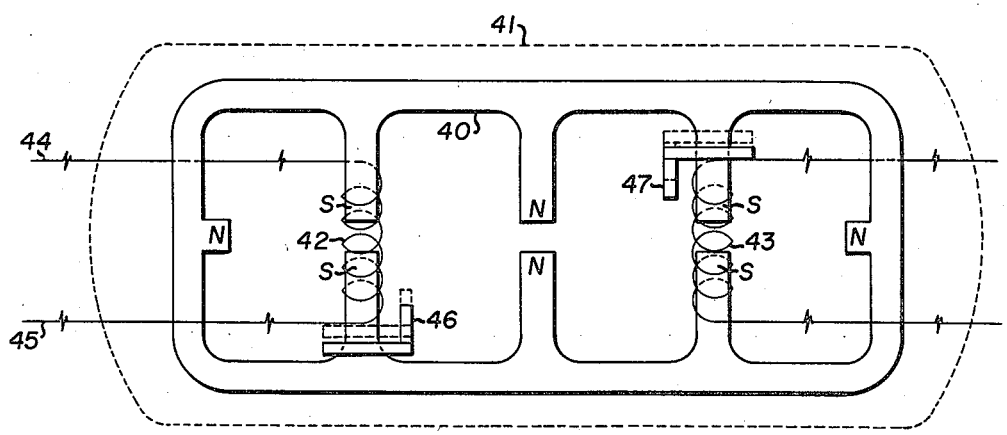

The improved seismic pickup of the present invention may be more fully understood by reference to the drawings illustrating the same. Figure 1 illustrates the geophone of the present invention wherein a single high frequency coil is utilized in conjunction with a reversing switch. Figure 2 illustrates a geophone arrangement of the present invention wherein the coil is of a relatively low frequency. Figure 3 illustrates an alternate balancing means for use in conjunction with a low frequency coil and a reversing switch. Figure 4 illustrates a geophone of the present invention wherein two coils are utilized in conjunction with clamping means to be applied to the coil not in actual use.

Referring specifically to Figure 1, the geophone comprises a flat pancake type case 1. This case has two relatively large flat surfaces and two relatively thin rounded ends. Disposed within the case and suitably mounted thereto is a permanent magnet 2 comprising north and south poles. A coil 3 mounted by conventional means is disposed about one of the poles.

As a seismic shock is imparted to the case 1 lying on the ground the case will move together with the permanent magnet with respect to the suspended coil 3. An E.M.F. will be induced in the coil. Suitable leads 4 and 5 connect to a reversing switch assembly comprising units 6 and 7 containing leads 8, 9, 10, 11, 12 and 13. Units 6 and 7 contain conducting liquids to a height of A and B. Thus, as an E.M.F. force is imparted to the coil, current will flow through lead 5 to contact 13 to contact 12 and to lead 14. The circuit will be completed by means of lead 4, contact 11, contact 10, contact 9, and lead 15. If the pancake geophone be reversed the circuit is completed through lead 5, contact 13, contact 8, contact 9 and lead 15; and by lead 4, contact 11, contact 12 and lead 14.

Figure 2 illustrates a geophone having a low frequency coil 20. Parts of Figure 2, which are similar to Figure 1, are shown with the same numeral as in Figure 1. The function of the geophone illustrated in Figure 2 is similar to that as described in Figure 1 except that the coil is mounted on a ring support or other suitable support means 21 which constitutes a part of a counterbalance 22 which comprises arms 23 and 24 pivoting about a pivot element 25. The dotted line 26 illustrates the position of the counterbalance when the geophone is reversed. Thus, a correct positioning of the coil about the magnet is automatically secured, irrespective of which face of the geophone is on the ground.

Figure 3 illustrates an alternate method of counterbalancing the wound coil in the correct position about the magnet. In order to simplify the description the reversing switch and the magnet are not shown in Figure 3 but merely the coil correcting mechanism. A plate 30 moves upwardly and downwardly in slides 31 depending upon which face of the geophone is up. Attached to plate 30 and to the coil is a snap across compression spring 32. The spring maintains an upward thrust on the coil thus tending to keep it at a predetermined correct height about the magnet. If the geophone be reversed the plate 30 will move to the position shown by the dotted line while the spring will assume the position shown by the dotted line and thus will continue to exert an upward thrust in order to maintain the coil in the proper position.

Referring specifically to Figure 4, a permanent magnet 40 is shown disposed and suitably attached within pancake case 41. Coils 42 and 43 are disposed about one pole of the magnet. As shown, coil 42 is in free suspension and will generate a current when the case is subjected to a seismic shock moving the case and the magnet with respect to the coil. Leads 44 and 45 will enable the measurement of any current or E.M.F. generated. A clamping means 46 which slides in suitable guides is shown disposed below coil 42. Upon reversal of the geophone the clamping means 46 will slide to position illustrated by the dotted lines and will thus place coil 42 in a non-free suspension state. Coil 43 is shown in the non-free suspension state due to the fact that clamping means 47 exerts a pressure on the same. Thus as the seismic shock is received the magnet will not move with respect to the coil and thus no E.M.F. will be generated in coil 43.

The invention is broadly concerned with a flat pancake type geophone which will position itself on the ground after being thrown from a moving truck. The geophone is characterized by having two relatively large flat surfaces and by being relatively thin with rounded edges. One type of geophone is the high frequency single coil structure wherein it is merely necessary to employ a reversing switch in conjunction with the coil to secure the correct polarity. Another type of geophone is the single coil low frequency structure wherein it is necessary to use in conjunction with the coil a reversing switch and a balancing or positioning means as illustrated or its equivalent. A third type is the double coil structure wherein it is not necessary to employ a reversing switch or balancing means but to simply employ clamping or equivalent means which will render one of the coils in a non-free state of suspension while permitting the other coil to be in a free state of suspension. The present invention is applicable to various types of geophones or seismometers such as the velocity type, the displacement type, the magnetic type. It is also applicable to the reluctance type of seismometers as well as the crystal and the capacity type.

While it is difficult to precisely define the frequency below which it is necessary to employ balancing means, it is felt that balancing means should be incorporated at frequencies below about 10; which permits about one half inch clearance. At frequencies above 10 to 15 it is felt that balancing means are not required as part of the structure.

Also, while it is not possible to precisely define the exact dimensions of the pancake geophone of the present invention, it is felt that satisfactory sizes should be from 2 to 6 inches wide, 4 to 8 inches long and 2 to 4 inches thick with rounded edges. These dimensions, of course, can be varied in a manner that the relationship of one dimension to the other produces a pancake flat type of geophone structure which will position itself either on one face or the other as the geophone is thrown to the ground.

What is claimed is:

1. A geophone assembly comprising a flat case adapted to stand in a stable manner on one of two relatively large opposed flat surfaces, a permanent magnet rigidly supported from and within said case, two induction coils supported from said case in a freely moveable relationship with said magnet, the axes of each of said coils being substantially normal to said flat surfaces, a separate lead connected to each end of each said coil, and clamping means adapted to selectively clamp one of said coils in a non-free suspension when one of said flat surfaces is the upper surface of the assembly and to selectively clamp the other coil when the opposite flat surface is the upper surface.

2. A geophone assembly comprising a pancake-shaped case with two flat surfaces as its upper and lower surfaces, a permanent magnet rigidly disposed within said case with said magnet having a plurality of south poles including a first and a second pair of south poles in which the south poles in each pair are spaced opposite one from the other with the axis of said poles being substantially normal to said surfaces, a separate induction coil suspended in freely movable relation with and adjacent each said pair, clamping means adapted to selectively clamp one of said coils in a non-free suspension when one of said flat surfaces is the upper surface of the assembly and to selectively clamp the other coil when the opposite flat surface is the upper surface.

References Cited in the file of this patent

UNITED STATES PATENTS

| | | |
|---|---|---|
| 2,440,903 | Massa | May 4, 1948 |
| 2,478,517 | Winterhatter | Aug. 9, 1949 |
| 2,548,990 | McLoad | Apr. 17, 1951 |
| 2,581,091 | Foster | Jan. 1, 1952 |
| 2,601,543 | McLoad | June 24, 1952 |
| 2,649,579 | Alexander | Aug. 18, 1953 |
| 2,725,548 | Harris | Nov. 29, 1955 |